(12) United States Patent
Lau

(10) Patent No.: US 6,888,276 B2
(45) Date of Patent: May 3, 2005

(54) ELECTRIC MOTOR

(75) Inventor: James Ching Sik Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/277,809

(22) Filed: Oct. 23, 2002

(65) Prior Publication Data

US 2003/0102744 A1 Jun. 5, 2003

(30) Foreign Application Priority Data

Oct. 23, 2001 (GB) .............................................. 0125402

(51) Int. Cl.⁷ ................................................. H02K 7/08
(52) U.S. Cl. .................... 310/90; 310/40 MM; 310/51; 310/67 R
(58) Field of Search ............................ 310/90, 51, 261, 310/40 MM, 233–237, 91, 67 R; 384/297, 279; 360/98.07, 99.08, 264.7, 266.4

(56) References Cited

U.S. PATENT DOCUMENTS

| | | | | |
|---|---|---|---|---|
| 3,786,289 A | * | 1/1974 | Baclawski et al. ............. | 310/90 |
| 3,988,711 A | * | 10/1976 | Van Benthuysen et al. . | 338/134 |
| 4,409,505 A | * | 10/1983 | Petersen ...................... | 310/90 |
| 4,629,261 A | * | 12/1986 | Eiermann et al. ........... | 310/90.5 |
| 5,152,106 A | * | 10/1992 | MacKay, Jr. ................ | 451/342 |
| 5,343,104 A | * | 8/1994 | Takahashi et al. ............ | 310/90 |
| 5,494,390 A | * | 2/1996 | Gonzales ..................... | 411/368 |
| 5,645,355 A | | 7/1997 | Tokushima et al. ......... | 384/133 |
| 5,917,258 A | * | 6/1999 | Kershaw et al. .............. | 310/51 |
| 6,023,114 A | | 2/2000 | Mori et al. .................... | 310/90 |
| 6,308,994 B1 | * | 10/2001 | Eidsmore .................... | 285/279 |
| 2002/0051590 A1 | | 5/2002 | Sugimoto et al. | |

FOREIGN PATENT DOCUMENTS

| | | |
|---|---|---|
| DE | 39 18 844 A1 | 12/1990 |
| EP | 0 542 446 A1 | 5/1993 |
| FR | 2 250 221 A1 | 5/1975 |
| GB | 2 060 091 A | 4/1981 |
| JP | 9-217735 A | 8/1997 |
| JP | 11 146597 A | 5/1999 |

OTHER PUBLICATIONS

Patent Abstract of Japan, vol. 1998, No. 02, Jan. 30, 1998, for Publication No. 09264236, with complete English translation of JP9 264326.

* cited by examiner

Primary Examiner—Tran Nguyen
Assistant Examiner—Leda Pham
(74) Attorney, Agent, or Firm—Birch, Stewart, Kolasch & Birch, LLP

(57) ABSTRACT

In an electric motor, a shaft 12 is supported by a sleeve bearing 10 and axial movement of the shaft 12 through the bearing 10 is restricted by an abutment 20 supported by or as a part of spacer 14. The abutment 20 has a thrust face 22 which bears against an end face 16 of the bearing 10 creating a thrust/bearing interface. The thrust face 22 has a part spherical profile to accommodate variations in the alignment between the bearing 10 and the shaft 12 due to manufacturing tolerances, etc.

12 Claims, 2 Drawing Sheets

ELECTRIC MOTOR

FIELD OF THE INVENTION

This invention relates to an electric motor and in particular to a thrust bearing interface in a miniature electric motor.

DESCRIPTION OF THE BACKGROUND ART

Miniature electric motors commonly use oil impregnated sintered bushings for the bearings because they are very economical. The bearings primary function is to support a rotor shaft. They can also function as a thrust bearing by confronting an abutment or spacer on the rotor. The abutment is often provided by a fiber washer or similar low friction material supported axially by a step in the form of a spacer or collar fixed to the shaft or a change in diameter of the shaft, thereby limiting axial movement of the rotor. In some applications, the washer is not used, with the spacer directly contacting the end face of the bearing. The bearing and the abutment are designed to make surface contact with each other.

However, when the bearing and the abutment are misaligned so that the faces are not parallel, we find that the edge of the abutment contacts the bearing face and gouges a hole or groove in the face of the bearing. This causes significant friction between the two parts, reducing the useful power output of the motor. As these motors are very small, the power loss may be significant and has been known to prevent further operation of the motor. The misalignment may need be only 1 or 2 degrees to cause problems. The misalignment may be due to improper fitting of the bearing or the abutment or due to assembly and manufacturing tolerances. These causes may lead to misalignments of 5 degrees or more, if not carefully controlled.

BRIEF SUMMARY OF THE INVENTION

Accordingly, there is a need for a thrust bearing interface which accommodates normal assembly misalignment.

Accordingly, in one aspect thereof, the present invention provides a miniature electric motor having: a stator, a rotor having a shaft, a sleeve bearing supporting the rotor and having an axial face facing the rotor, an abutment on the shaft having a thrust face opposing the end face of the bearing and wherein the thrust face is profiled with an axial separation between a radially inner location adjacent the shaft and a radially outer location adjacent the periphery of the abutment with the inner location projecting towards the bearing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and of the scope of the invention will become apparent to those skilled in the art from this detailed description.

BRIEF DESCRIPTION OF THE DRAWINGS

A preferred embodiment of the invention will now be described, by way of example only, in which.

DETAILED DESCRIPTION OF THE PREFERRED EMBODIMENT

Figure 1:
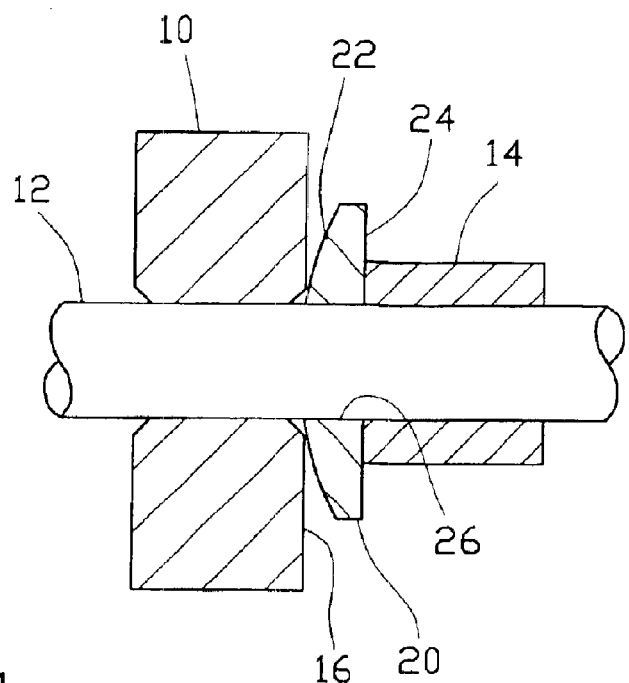
FIG. 1 is a sectional side view of a bearing/spacer interface according to the preferred embodiment.

The bearing/abutment interface of the preferred embodiment is shown in FIG. 1. The bearing 10 is an oil impregnated sintered bronze bushing for use in a miniature electric motor. Although the size is not critical as the size of the bearing will vary depending on the application and the size of the motor in which it is to be used, it is helpful to realize that a typical bearing may have an outside diameter of 5.5 mm and a nominal internal diameter of 2.0 mm and a width or thickness of 1.7 mm.

The bearing is shown fitted to a shaft 12. Also fitted to the shaft is a spacer 14. The abutment is located between the bearing 10 and the spacer 14. The abutment is shown in the form of a washer 20 which is axially supported in one direction by the spacer 14. The abutment has a thrust face 22 which bears against the adjacent axial end face 16 of the bearing 10 forming a thrust bearing interface which limits the axial movement of the shaft 12 through the bearing 10. The opposite side 24 of the abutment is in contact with the spacer 14. A through hole 26 accommodates the shaft 12.

The thrust face 22 is profiled so as to be convex or partly spherical. This profile gives the thrust face an axial dimension from a radially inner region adjacent the shaft 12 to a radially outer region at the periphery with the inner region being closer to the bearing 10 than the outer region.

Operation of the interface will now be explained with reference to FIG. 2. Here, the set up is similar to FIG. 1 but due to manufacturing tolerances, the shaft 12 is tilted with respect to the bearing 10. Previously this would result in the abutment washer scoring or gauging the end face of the bearing causing rapid wearing of both the washer and the bearing and creating a high friction contact adversely affecting the operation of the motor. In the present invention, however, due to the rounded profile of the abutment thrust face 22, the edge of the washer 20 does not contact the bearing end face 16 allowing normal bearing contact to be maintained even though the shaft 12 and bearing 10 are misaligned.

Figure 3:
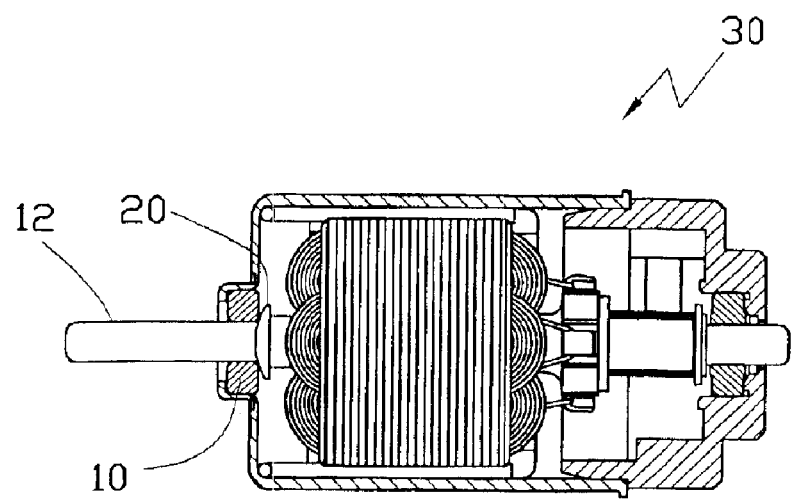
FIG. 3 is a part sectional view of a miniature electric motor incorporating the bearing of FIG. 1.

FIG. 3 shows a typical motor 30 to which the present invention has particular application. The motor 30 is a miniature PMDC motor. While the thrust bearing interface is only shown at the drive end, the arrangement could be applied to either or both ends of the motor.

Figure 2:
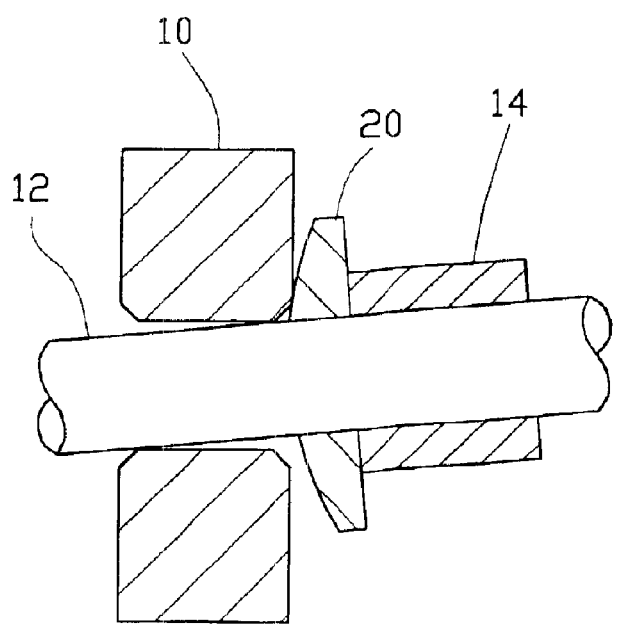
FIG. 2 is a detailed schematic explaining the interface of FIG. 1.

The abutment is shown in FIGS. 1 and 2 as a separate washer 20 supported by a spacer 14. However, the abutment could be formed as an integral part of the spacer provided the spacer was made of suitable material. To reduce friction, the thrust face 22 could be coated with a low friction substance such as PTFE. Also, although shown planar, the end face of the bearing could be profiled or rounded with advantageous effect.

Figure 4:
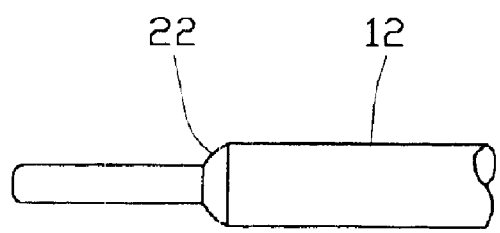
FIG. 4 is a view of an alternative spacer.

As an alternative to using a spacer, the abutment could be supported axially by a step in the diameter of the shaft 12. Indeed, as shown in FIG. 4, the abutment could be integral with the shaft 12 with the thrust face 22 being formed on the radially extending face of a step in the shaft diameter.

The embodiment described above is given by way of example only and various modifications will be apparent to persons skilled in the art without departing from the scope of the invention as defined in the appended claims.

I claim:

1. A miniature electric motor having:

a stator;

a rotor having a shaft;

a sleeve bearing supporting the rotor and having an axial face facing the rotor; and an abutment on the shaft having a thrust face opposing the end face of the bearing;

wherein the thrust face is profiled with an axial separation between a radially inner location adjacent the shaft and a radially outer location adjacent the periphery of the abutment with the inner location projecting towards the bearing whereby an outer edge of the abutment is spaced from the bearing.

2. The motor of claim 1, wherein the thrust face is smoothly profiled.

3. The motor of claim 1, wherein the thrust face is part spherical.

4. The motor of claim 3, wherein the end face of the bearing is planar.

5. The motor of claim 1, wherein the bearing is an oil impregnated sintered bearing.

6. The motor of claim 1, wherein the abutment is a molded washer fitted to the shaft.

7. The motor of claim 1, wherein the abutment is integral with a spacer fitted to the shaft.

8. The motor of claim 1, wherein the abutment and the shaft are an integral, one-piece structure.

9. The motor of claim 8, wherein the abutment is a step in the shaft diameter.

10. The motor of claim 9, wherein the thrust face has a coating of low friction material.

11. The motor of claim 1, wherein the thrust face has a coating of low friction material.

12. The motor of claim 1, wherein the end face of the bearing is planar.

* * * * *